(12) United States Patent
Serizawa et al.

(10) Patent No.: US 6,815,849 B2
(45) Date of Patent: Nov. 9, 2004

(54) MAGNETO GENERATOR

(75) Inventors: Makoto Serizawa, Numazu (JP); Shinji Komatsu, Numazu (JP)

(73) Assignee: Kokusan Denki Co., Ltd., Shizuoka-Ken (JP)

( * ) Notice: Subject to any disclaimer, the term of this patent is extended or adjusted under 35 U.S.C. 154(b) by 0 days.

(21) Appl. No.: 10/770,954

(22) Filed: Feb. 3, 2004

(65) Prior Publication Data

US 2004/0164628 A1 Aug. 26, 2004

(30) Foreign Application Priority Data

Feb. 25, 2003 (JP) ......................................... 2003-047595

(51) Int. Cl.$^7$ ............................ H02K 9/06; H02K 1/32; H02K 21/22

(52) U.S. Cl. ............................. 310/62; 310/58; 310/61; 310/156.26; 310/266

(58) Field of Search .............................. 310/52, 58, 59, 310/60 R, 61, 62, 63, 60 A, 156.12, 156.26, 74, 266; 290/1 B (56) References Cited

U.S. PATENT DOCUMENTS

| | | | | |
|---|---|---|---|---|
| 4,797,602 A | * | 1/1989 | West ............................ | 322/10 |
| 5,217,353 A | * | 6/1993 | De Filippis ................. | 417/368 |
| 6,107,714 A | * | 8/2000 | Fischer ........................ | 310/77 |
| 6,384,494 B1 | * | 5/2002 | Avidano et al. .............. | 310/58 |
| 6,744,157 B2 | * | 6/2004 | Choi et al. ................... | 310/62 |

FOREIGN PATENT DOCUMENTS

| | | | | |
|---|---|---|---|---|
| DE | 3329720 A1 | * | 2/1984 | ............ F02P/1/00 |
| JP | 3038781 | | 4/1977 | ............ H02K/9/06 |
| JP | 59035548 A | * | 2/1984 | ............ H02K/9/06 |
| JP | 04038149 A | * | 2/1992 | ............ H02K/9/06 |
| JP | 6-91718 | | 11/1994 | ............ H02K/9/06 |
| JP | 2000217321 A | * | 8/2000 | .......... H02K/21/22 |
| JP | 2002136080 A | * | 5/2004 | .......... H02K/21/22 |

* cited by examiner

Primary Examiner—Burton Mullins
(74) Attorney, Agent, or Firm—Pearne & Gordon LLP (57) ABSTRACT

A magneto generator including: a magnet rotor having a cup-shaped rotor yoke formed with a plurality of air vents in a bottom wall and a permanent magnet secured to an inner periphery of a peripheral wall of the rotor yoke; and an armature having an armature coil, wherein a cooling air introducing portion is provided for each of the plurality of air vents, a cooling air introducing passage for introducing cooling air into a corresponding air vent is formed inside the cooling air introducing portion, the cooling air introducing passage has a rectangular section, and opens in a sloping direction with respect to the direction orthogonal to a plane including both a straight line between the center of the bottom wall and the center of the air vent, and a central axis of the magnet rotor.

13 Claims, 6 Drawing Sheets

MAGNETO GENERATOR

TECHNICAL FIELD OF THE INVENTION

The present invention relates to an outer rotor type magneto generator including a magnet rotor comprised by mounting a permanent magnet to an inner periphery of a peripheral wall of a substantially cup-shaped rotor yoke, and an armature placed inside the magnet rotor.

BACKGROUND OF THE INVENTION

Figure 6A:
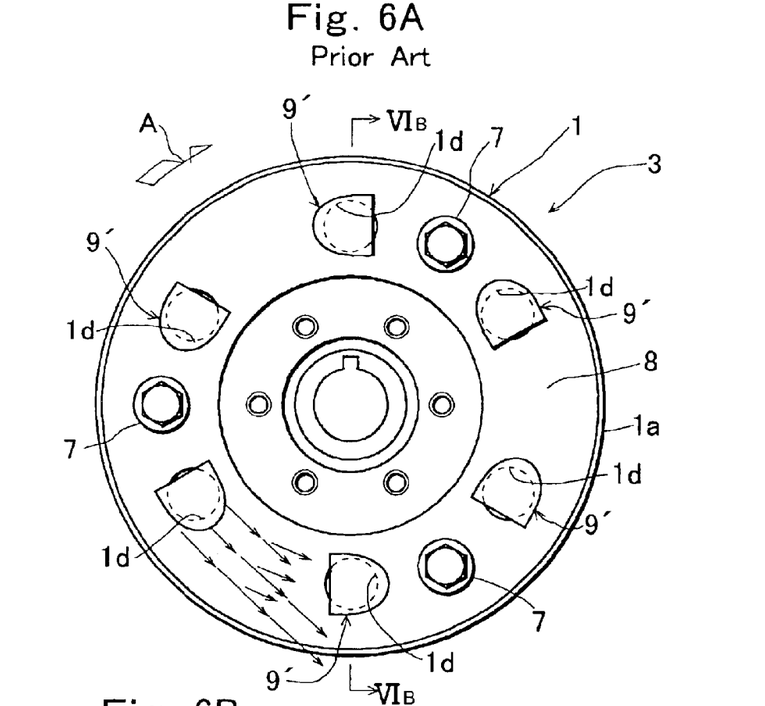
FIG. 6A is a front view of a conventional magneto generator.
Figure 6B:
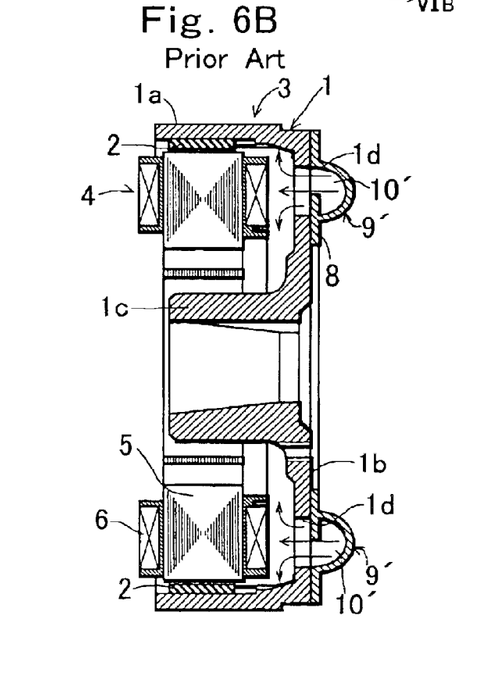
FIG. 6B is a sectional view taken along the line VIB—VIB in FIG. 6A.

An outer rotor type magneto generator includes, as shown in FIGS. 6A and 6B, a magnet rotor 3 having a rotor yoke 1 formed to become a substantial cup shape having a peripheral wall 1a and a bottom wall 1b, and a permanent magnet 2 mounted to an inner periphery of the peripheral wall 1a of the rotor yoke 1, and an armature 4 placed inside the magnet rotor 3.

The rotor yoke 1 has a boss 1c at the center of the bottom wall 1b, and the boss is mounted to a rotation axis of an unshown prime mover (in many cases, an internal combustion engine).

The armature 4 includes an armature core 5 and an armature coil 6 wound around the armature core, and is secured to a casing or the like of the prime mover, so that a magnetic pole portion provided on an outer peripheral portion of the armature core 5 faces the magnet 2 of the magnet rotor 3 with a predetermined gap therebetween. A generator shown in FIGS. 6A to 6C is disclosed in Japanese Patent Publication No.6-91718.

In such a generator, the armature coil 6 is heated by the loss produced when a load current passes through the armature coil 6, and in order to produce large output from the generator, efficient cooling of the armature coil is required.

Japanese Patent Publication No. 6-91718 proposes a cooling structure where a bottom wall 1b of a rotor yoke 1 is drilled to form a plurality of air vents 1d, 1d, . . . along an outer peripheral portion of the bottom wall 1b, and a cooling air introducing portion 9' corresponding to each air vent 1d is provided in an annular plate 8 secured by screws 7 to an outer surface of the bottom wall 1b of the rotor yoke 1, thereby introducing cooling air into each air vent 1d through a cooling air introducing passage 10' inside the cooling air introducing portion 9'.

Figure 6C:
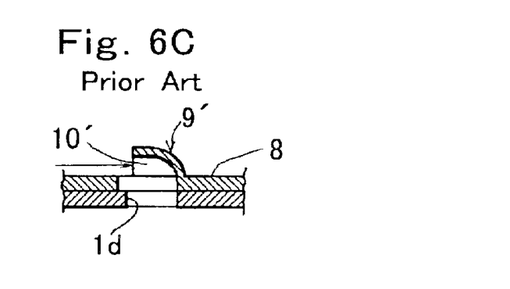
FIG. 6C is a sectional view of a cooling air introducing portion and its vicinity of the magneto generator in FIG. 6A.

As shown in FIG. 6C, the cooling air introducing portion 9' is formed to protrude in an opposite direction to the bottom wall 1b and cover at least a part of a corresponding air vent 1d, and the cooling air introducing passage 10' having a semicircular section is formed inside the cooling air introducing portion 9'. The cooling air introducing passage 10' is provided to open forward in the rotational direction of the rotor yoke 1 (in the direction of the arrow in FIG. 6A).

In the magneto generator disclosed in Japanese Patent Publication No. 6-91718, as shown in FIG. 6A, the cooling air introducing portion 9' is provided so that the cooling air introducing passage 10' opens tangentially of the outer peripheral portion of the rotor yoke. This, combined with the semicircular section of the cooling air introducing passage 10', prevents increase in sectional area of an opening of the cooling air introducing passage 10'. Thus, the amount of cooling air blown on the armature 4 through the air vent 1d is limited, which prevents enhancement of the cooling effect of the armature.

SUMMARY OF THE INVENTION

An object of the present invention is to provide a magneto generator capable of blowing cooling air larger in amount than a conventional magneto generator on an armature through an air vent provided in a bottom wall of a rotor yoke to enhance the cooling effect of the armature.

The invention is directed to a magneto generator including: a magnet rotor having a cup-shaped rotor yoke with a peripheral wall and a bottom wall, and a permanent magnet mounted to an inner periphery of the peripheral wall of the rotor yoke; and an armature placed inside the magnet rotor.

In the invention, the bottom wall of the rotor yoke is drilled at a portion closer to an outer periphery to circumferentially provide a plurality of air vents in the peripheral wall of the rotor yoke, and a hollow cooling air introducing portion is provided for each of the plurality of air vents.

Each cooling air introducing portion is provided to protrude in an opposite direction to an opening in the peripheral wall of the rotor yoke and cover at least a part of a corresponding air vent, and a cooling air introducing passage is formed inside the cooling air introducing portion.

An end of the cooling air introducing passage inside the cooling air introducing portion communicates with the inside of the rotor yoke through a corresponding air vent, while the other end of the cooling air introducing passage inside the cooling air introducing portion opens forward in the rotational direction of the magnet rotor through an opening end provided in the cooling air introducing portion.

The cooling air introducing portion has an outer side wall provided to extend in a sloping direction from near a corresponding air vent toward an outer peripheral portion of the rotor yoke and reach the opening end of the cooling air introducing portion.

The opening end of the cooling air introducing portion is directed in a sloping direction toward an inner diameter of the rotor yoke with respect to the direction orthogonal to a reference plane including both a straight line between the center of the bottom wall of the rotor yoke and the center of a corresponding air vent, and a central axis of the rotor yoke.

As described above, the outer side wall of the cooling air introducing portion is provided to extend in the sloping direction from near the corresponding air vent toward the outer peripheral portion of the rotor yoke and reach the opening end of the cooling air introducing portion, and the opening end of the cooling air introducing portion is directed in the sloping direction with respect to the direction orthogonal to the reference plane. This allows a sectional area of the cooling air introducing passage at the opening end of the cooling air introducing portion to be larger than a sectional area of the cooling air introducing passage inside a portion along the reference plane of the cooling air introducing portion.

Therefore, according to the invention, the cooling air introducing passage has a larger opening area than a conventional magneto generator having the opening end of the cooling air introducing portion opening tangentially of the rotor yoke, and thus a larger amount of cooling air can be introduced into the cooling air introducing portion with rotation of the rotor to enhance the cooling effect of the armature as compared with the conventional magneto generator of this type.

BRIEF DESCRIPTION OF THE DRAWINGS

The above and other objects and features of the present invention will be apparent from the detailed description of the preferred embodiments of the invention, which is described and illustrated with reference to the accompanying drawings, in which.

DETAILED DESCRIPTION OF THE PREFERRED EMBODIMENTS

Now, embodiments of the invention will be described with reference to the drawings.

FIGS. 1A to 1C and FIGS. 2A, 2B show a first embodiment of the invention, in which a reference numeral 1 denotes a rotor yoke having a peripheral wall 1a and a bottom wall 1b and generally formed in a substantial cup shape. A permanent magnet 2 is mounted to an inner periphery of the peripheral wall 1a of the rotor yoke 1, and a magnet rotor 3 is comprised of the rotor yoke 1 and the permanent magnet 2. The rotor yoke 1 has a boss 1c at the center of the bottom wall 1b, and the boss is mounted to a rotation axis of an unshown prime mover (in many cases, an internal combustion engine).

Figure 1A:
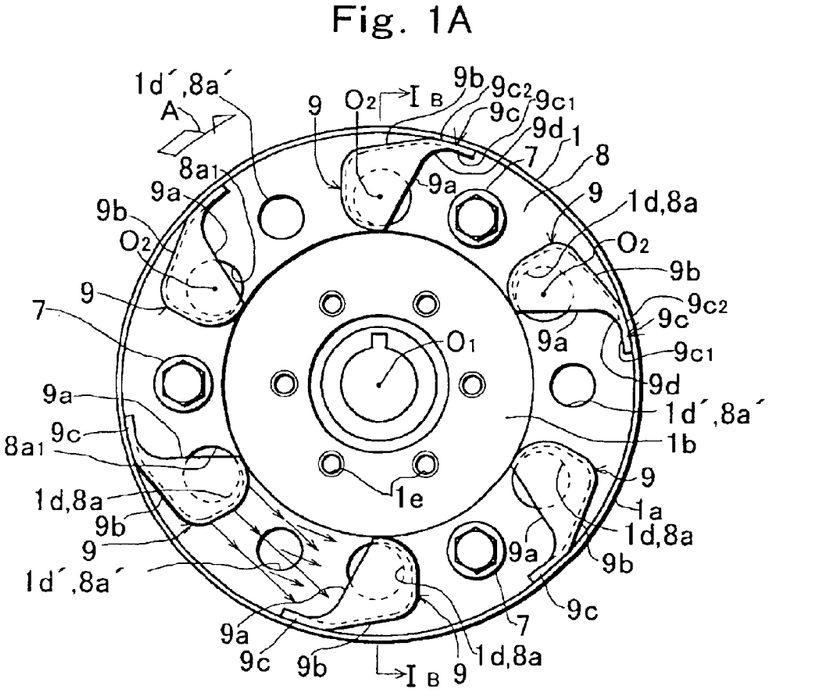
FIG. 1A is a front view of a magneto generator according to a first embodiment of the invention.
Figure 1B:
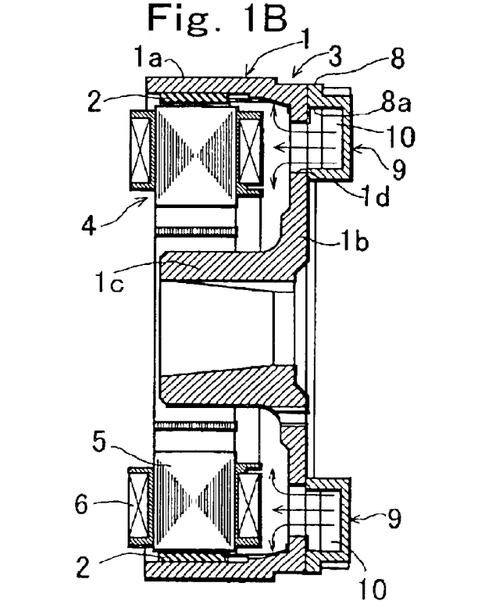
FIG. 1B is a sectional view taken along the line IB—IB in FIG. 1A.

Further, a reference numeral 4 denotes an armature placed inside the magnet rotor 3. The armature 4 includes an armature core 5 and an armature coil 6 wound around the armature core. The armature 4 is placed coaxially with the magnet rotor 3, and secured to a casing or the like of the prime mover, so that a magnetic pole portion provided on an outer peripheral portion of the armature core 5 faces the magnet 2 of the magnet rotor 3 with a predetermined gap therebetween.

In order to introduce cooling air into the magnet rotor 3 for cooling the armature 4, the bottom wall 1b of the rotor yoke 1 is drilled at a portion closer to an outer periphery to circumferentially form a plurality of (six in the shown example) circular air vents 1d, 1d, . . . in the peripheral wall 1a at regular intervals (at 60° intervals). In the shown example, besides the six air vents, three auxiliary air vents 1d' each having a smaller diameter than the air vent 1d are provided at 120° intervals. The inner diameter of the auxiliary air vent 1d' may be equal to the inner diameter of the air vent 1d.

Figure 2A:
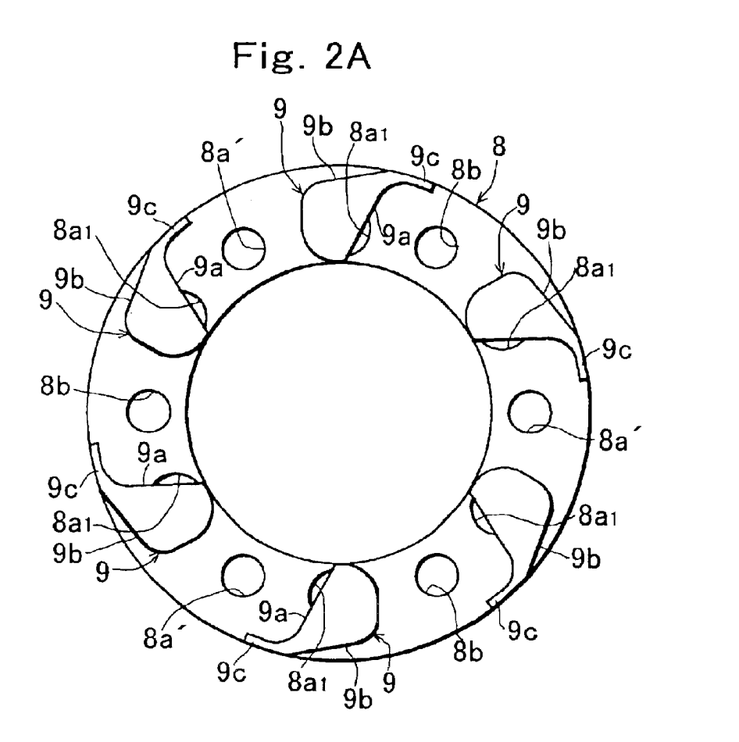
FIG. 2A is a front view of an annular plate mounted to a rotor yoke for providing the cooling air introducing portion in the embodiment in FIGS. 1A to 1C.
Figure 2B:
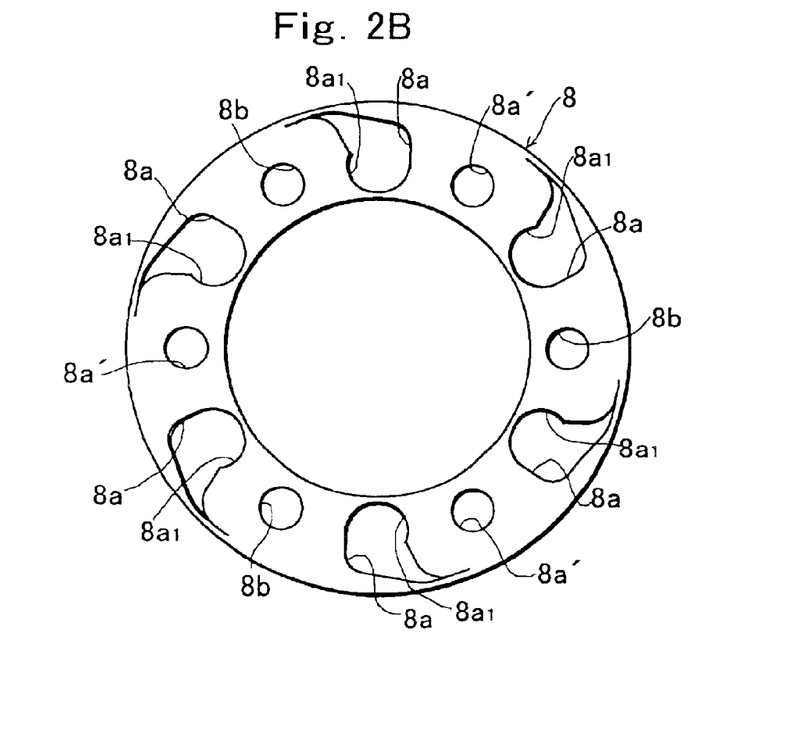
FIG. 2B is a rear view of the annular plate in FIG. 2A.

There is provided an annular plate 8 having a through hole 8a corresponding to each air vent 1d of the bottom wall 1b of the rotor yoke 1, and an auxiliary through hole 8a' corresponding to the auxiliary air vent 1d', and the annular plate 8 has cooling air introducing portions 9, 9 . . . corresponding to the through holes 8a, 8a . . . and the air vents 1d, 1d . . .

The annular plate 8 is placed on an outer surface of the bottom wall 1b of the rotor yoke 1 with each through hole 8a communicating with a corresponding air vent 1d and each auxiliary through hole 8a' communicating with a corresponding auxiliary air vent 1d', and fastened by a plurality of screws 7 to the bottom wall 1b of the rotor yoke 1.

Figure 1C:
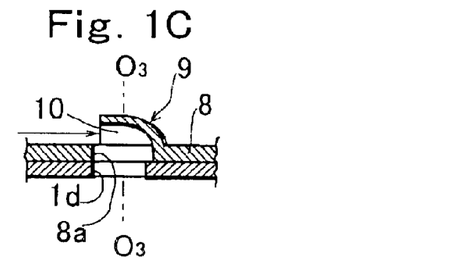
FIG. 1C is a sectional view of a cooling air introducing portion and its vicinity provided in the magneto generator in FIG. 1A.

The cooling air introducing portion 9 is provided to protrude in an opposite direction to the rotor yoke 1 from the side of the annular plate 8 opposite to the rotor yoke 1 and cover most of the corresponding through hole 8a from outside. As shown in FIG. 1B and FIG. 1C, a cooling air introducing passage 10 is formed inside the cooling air introducing portion 9. An end of the cooling air introducing passage communicates with the corresponding air vent 1d of the bottom wall of the rotor yoke 1 through the corresponding through hole 8a.

The cooling air introducing portion 9 has an opening end 9a where the other end of the cooling air introducing passage 10 therein opens forward in the rotational direction of the magnet rotor. In the invention, the opening end 9a is provided in a sloping direction toward an inner diameter of the rotor yoke 1 with respect to the direction orthogonal to a plane (the plane O3—O3 in FIG. 1C, which is herein referred to as a reference plane) including both a straight line between the center O1 of the bottom wall 1b of the rotor yoke 1 and the center O2 of the air vent 1d, and a central axis of the rotor yoke 1 (the direction being a tangential direction of the rotor yoke at the intersection of the reference surface and the outer periphery of the rotor yoke 1). In the shown example, the end surface of the opening end 9a of the cooling air introducing portion 9 is a flat surface extending along a plane sloped with respect to the reference plane O3—O3.

In the invention, an outer side wall 9b of the cooling air introducing portion 9 placed on the outer peripheral side of the rotor yoke is provided to extend in a sloping direction from near the corresponding air vent 1d and the through hole 8a toward the outer peripheral portion of the rotor yoke 1 and reach the opening end 9a of the cooling air introducing portion.

According to the invention, as described above, the outer side wall 9b of the cooling air introducing portion placed on the outer peripheral side of the rotor yoke is provided to extend in the sloping direction from near the air vent toward the outer peripheral portion of the rotor yoke and reach the opening end of the cooling air introducing passage, and the opening end 9a of the cooling air introducing portion 9 is provided in the sloping direction toward the inner diameter of the rotor yoke with respect to the direction orthogonal to the reference plane. This allows a sectional area of the cooling air introducing passage 10 at the opening end 9a of the cooling air introducing portion to be larger than a sectional area of the cooling air introducing passage 10 at a portion along the reference plane O3—O3 of the cooling air introducing portion. Therefore, this allows the sectional area of the cooling air introducing passage 10 at the opening end 9a of the cooling air introducing portion 9 to be larger than that of the conventional magneto generator in FIGS. 6A to 6C, and thus a larger amount of air can be introduced into the cooling air introducing passage 10 from the opening end of the cooling air introducing portion.

In the invention, the sectional shape of the cooling air introducing portion 9 is determined so that the sectional shape of the cooling air introducing passage therein is substantially rectangular between the portion along the reference plane O3—O3 and the opening end 9a.

As described above, the rectangular section of the cooling air introducing passage can be larger than the semicircular section of the conventional cooling air introducing passage.

Further, in the invention, a plate-like vane portion 9c extending forward in the rotational direction of the magnet rotor from the opening end 9a of each cooling air introducing portion 9 along the outer peripheral portion of the rotor yoke 1 is provided to be continuous with the outer side wall 9b of the cooling air introducing portion 9 placed on the outer peripheral side of the rotor yoke 1. Each vane portion 9c has an inner side surface 9c1 facing the inner diameter side of the rotor yoke and an outer side surface 9c2 facing the outer diameter side of the rotor yoke, and a boundary between the opening end 9a of the cooling air introducing portion 9 and each vane portion 9c is formed so that an end surface of the opening end 9a of the cooling air introducing portion 9 is continuous with the inner side surface 9c1 of the vane portion 9c via a smoothly curved connecting surface 9d. The cooling air introducing portion 9 is formed to have a substantially comma-shaped outline when the rotor 3 is viewed from the front.

As described above, the end surface of the opening end 9a of the cooling air introducing portion 9 is continuous with the inner side surface 9c1 of the vane portion 9c via the smoothly curved connecting surface 9d, which prevents turbulence of air flowing into the cooling air introducing passage to increase the amount of air flowing into the cooling air introducing passage.

As shown in FIG. 2B, each through hole 8a provided in the annular plate 8 is formed to have a comma shape like the outline of the cooling air introducing portion 9, and an arc portion 8a1 aligned with a part of the corresponding air vent 1d of the rotor yoke 1 is formed in a part of an inner peripheral edge of the through hole 8a placed on the opening end side of the cooling air introducing portion 9. As shown in FIG. 2A, the cooling air introducing portion 9 is provided so as not to cover the arc portion 8a1 of the through hole 8a, so that when the annular plate 8 is fastened to the bottom wall 1b of the rotor yoke 1, the part of the air vent 1d aligned with the arc portion 8a1 of the through hole 8a is not covered with the cooling air introducing portion 9 but is exposed.

In the shown example, the annular plate 8 has the auxiliary through hole 8a' aligned with the auxiliary air vent 1d' of the rotor yoke, and a hole 8b through which a bolt 7 passes, and the inside and the outside of the rotor yoke are communicated through the auxiliary air vent 1d' in the bottom wall of the rotor yoke and the auxiliary through hole 8a' of the annular plate 8.

In FIG. 1, 1e denotes a screw hole provided in the bottom wall 1b of the rotor yoke 1 to mount a tool for withdrawing the rotor yoke 1 from the rotation axis (not shown).

As described above, the vane portion 9c extending forward in the rotational direction of the rotor from the opening end 9a of the cooling air introducing portion 9 is provided to protrude forward in the rotational direction from the opening end 9a of the cooling air introducing portion 9, which allows a large amount of air to be introduced into the cooling air introducing passage 10 along the vane portion 9c when the rotor yoke 1 rotates. This, combined with the above described increased sectional area of the cooling air introducing passage 10, increases the amount of air introduced into the rotor yoke 1 to enhance the cooling effect of the armature.

Figure 3A:
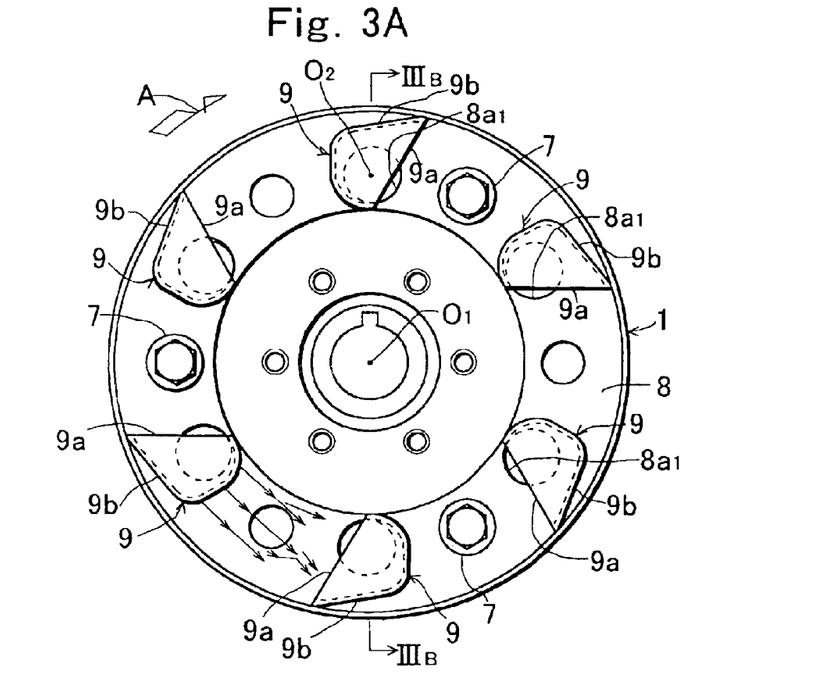
FIG. 3A is a front view of a magneto generator according to a second embodiment of the invention.
Figure 3B:
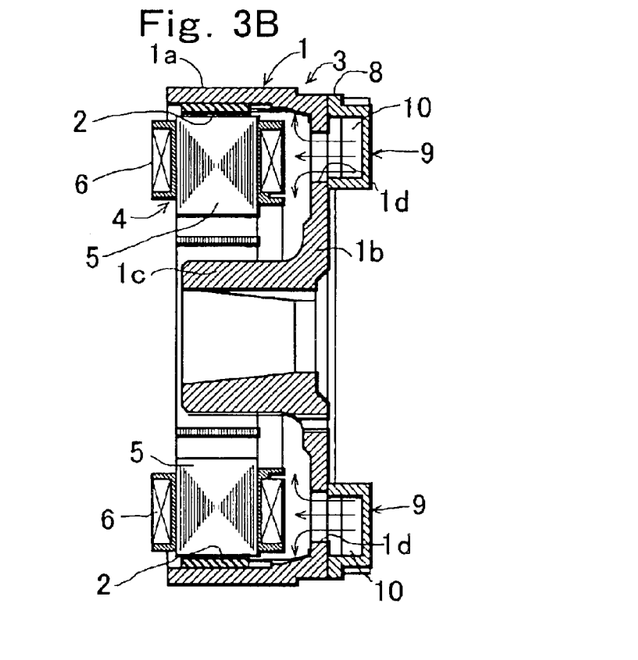
FIG. 3B is a sectional view taken along the line IIIB—IIIB in FIG. 3A.

It is preferable to provide the vane portion 9c protruding forward in the rotational direction from the opening end 9a of the cooling air introducing portion 9 as in the above described embodiment, but the vane portion 9c is not necessarily provided and may be omitted as in a second embodiment of the invention shown in FIGS. 3A and 3B. In the invention, the side wall 9b of the cooling air introducing portion 9 is sloped, and the opening end 9a is sloped, thereby increasing the sectional area of the cooling air introducing passage at the opening end 9a of the cooling air introducing portion to allow the large amount of cooling air to be introduced. This can enhance the cooling effect of the armature without the vane portion 9c, as compared with the conventional magneto generator.

Figure 4A:
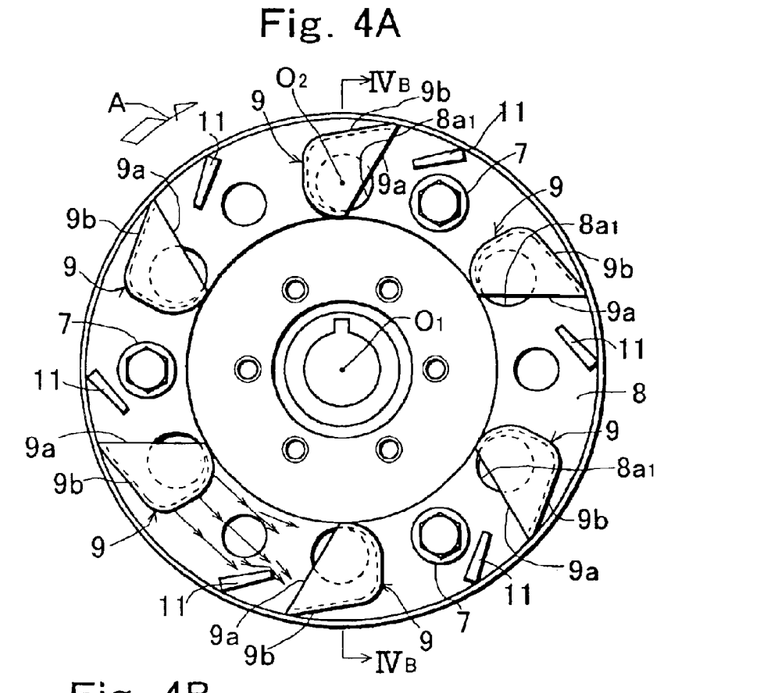
FIG. 4A is a front view of a magneto generator according to a third embodiment of the invention.
Figure 4B:
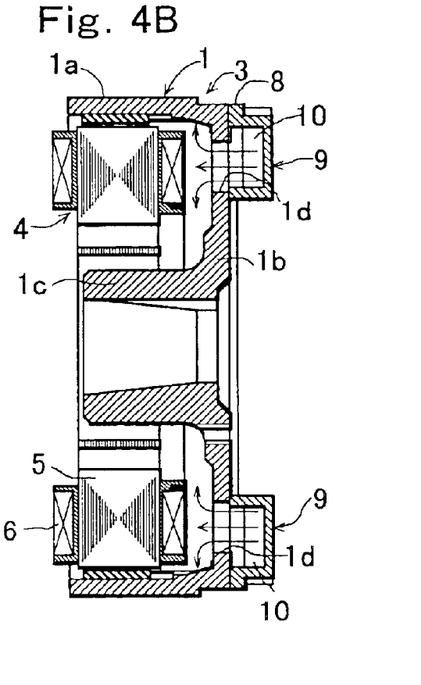
FIG. 4B is a sectional view taken along the line IVB—IVB in FIG. 4A.
Figure 4C:
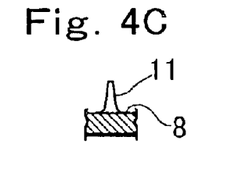
FIG. 4C is a sectional view of a straightening vane provided in the magneto generator in FIG. 4A.

FIG. 4A to FIG. 4C show a third embodiment of the invention. In this embodiment, a straightening vane 11 is provided integrally with an annular plate 8 secured to a bottom wall 1b of a rotor yoke 1, the straightening vane 11 being placed more forward than a cooling air introducing portion 9 in the rotational direction of the rotor yoke 1 and straightening a flow of air flowing into a cooling air introducing passage 10 inside the cooling air introducing portion 9. The cooling air introducing portion 9 is formed without a vane portion like the second embodiment in FIG. 3.

As shown in FIG. 4A to FIG. 4C, the straightening vane 11 is provided to straighten the flow of air introduced into the cooling air introducing passage 10 and prevent occurrence of vortexes in the vicinity of an inlet of the cooling air introducing passage 10, thereby increasing the amount of air introduced into the cooling air introducing passage 10.

Figure 5A:
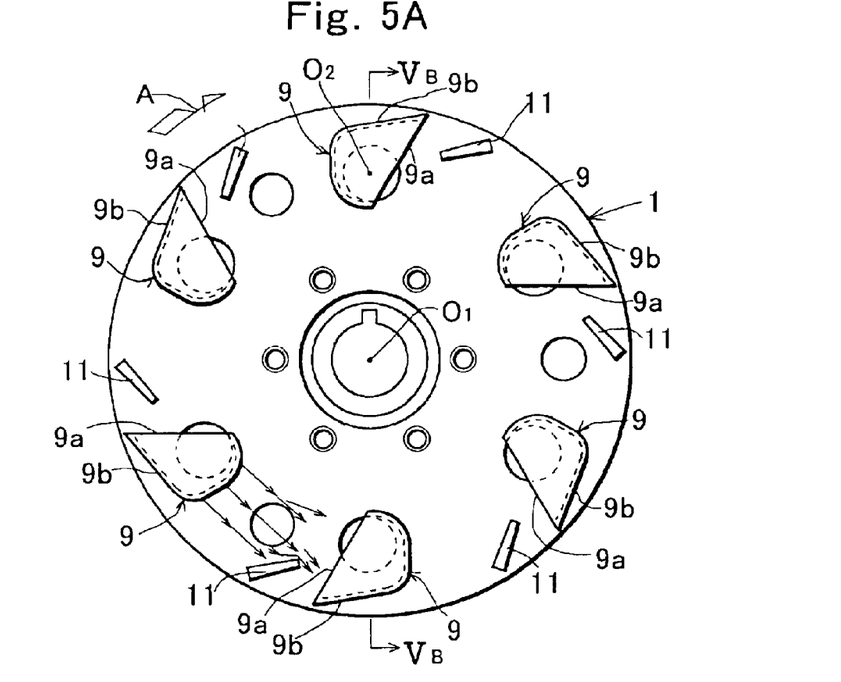
FIG. 5A is a front view of a magneto generator according to a fourth embodiment of the invention.
Figure 5B:
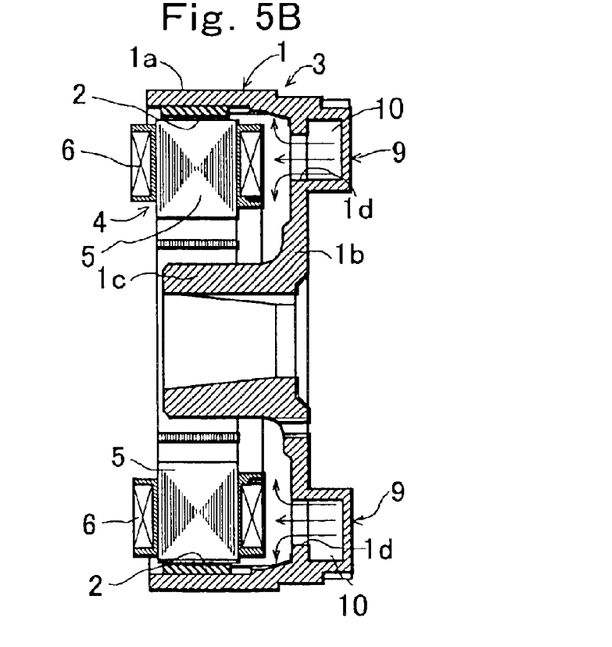
FIG. 5B is a sectional view taken along the line VB—VB in FIG. 5A.

FIG. 5A and FIG. 5B show a fourth embodiment of the invention. In each of the above described embodiments, each cooling air introducing portion 9 is provided in the annular plate 8 fastened to the rotor yoke 1, while in the embodiment in FIG. 5A and FIG. 5B, each cooling air introducing portion 9 is provided integrally with a bottom wall 1b of a rotor yoke 1.

In the embodiment in FIG. 5A and FIG. 5B, the cooling air introducing portion 9 is formed without a vane portion like the embodiment in FIGS. 4A to 4C. A straightening vane 11 is provided integrally with the bottom wall 1b of the rotor yoke 1, the straightening vane 11 being placed more forward than an opening end of the cooling air introducing portion in the rotational direction of a magnet rotor and straightening air flowing into a cooling air introducing passage inside the cooling air introducing portion.

The cooling air introducing portion 9 may be provided integrally with the bottom wall 1b of the rotor yoke 1 also when the vane portion 9c is provided to be continuous with the outer side wall 9b of the cooling air introducing portion 9 like the embodiment in FIG. 1A to FIG. 1C.

In each of the above described embodiments, the cooling air introducing portion 9 is provided so as not to cover the part of the air vent 1d provided in the bottom wall 1b of the rotor yoke 1, but the cooling air introducing portion 9 may be provided to cover the entire air vent 1d provided in the bottom wall of the rotor yoke.

As described above, according to the invention, the side wall of the cooling air introducing portion placed on the outer peripheral side of the rotor yoke is provided to extend in the sloping direction from near the air vent toward the outer peripheral portion of the rotor yoke and reach the opening end of the cooling air introducing portion, and the opening end of the cooling air introducing portion is directed in the sloping direction toward the inner diameter of the rotor yoke. This allows the sectional area of the cooling air introducing passage at the opening end to be larger than that of the conventional magneto generator having the cooling air introducing passage opening tangentially of the rotor yoke. Thus, a larger amount of cooling air can be introduced into the cooling air introducing passage with rotation of the magnet rotor to increase the amount of cooling air blown on the armature as compared with the conventional magneto generator and enhance the cooling effect of the armature.

In the invention, when the sectional shape of the cooling air introducing portion is determined so that the sectional shape of the cooling air introducing passage inside the cooling air introducing portion is substantially rectangular between the portion along the reference plane of the cooling air introducing portion and the opening end of the cooling air introducing portion, the sectional area of the cooling air introducing passage can be larger than when the cooling air introducing portion is formed so that the cooling air introducing passage has the semicircular section. Thus, a still larger amount of cooling air can be introduced into the air vent through the cooling air introducing passage to further enhance the cooling effect of the armature.

Further, in the invention, when the vane portion extending forward in the rotational direction of the magnet rotor from the opening end of the cooling air introducing portion along the outer peripheral portion of the rotor yoke is provided to be continuous with the outer side wall of the cooling air introducing portion placed on the outer peripheral side of the rotor yoke, a large amount of air can be introduced into the cooling air introducing passage along the vane portion when the magnet rotor rotates to further enhance the cooling effect.

In the invention, when the straightening vane that straightens the air flowing into the cooling air introducing passage is provided more forward than the opening end of the cooling air introducing portion in the rotational direction of the magnet rotor, the flow of air introduced into the cooling air introducing passage can be straightened to prevent occurrence of vortexes in the vicinity of the inlet of the cooling air introducing passage, thereby further increasing the amount of air introduced into the cooling air introducing passage to enhance the cooling effect of the armature.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A magneto generator comprising:
   a magnet rotor having a cup-shaped rotor yoke with a peripheral wall and a bottom wall and a permanent magnet mounted to an inner periphery of the peripheral wall of the rotor yoke; and an armature placed inside the magnet rotor,
   wherein the bottom wall of said rotor yoke is drilled at a portion closer to an outer periphery to provide a plurality of circumferential air vents in said peripheral wall,
   a hollow cooling air introducing portion is provided for each of the plurality of air vents in the bottom wall of said rotor yoke,
   each cooling air introducing portion is formed to protrude in an opposite direction to an opening in the peripheral wall of said rotor yoke and cover at least a part of a corresponding air vent, and a cooling air introducing passage is formed inside the cooling air introducing portion,
   an end of the cooling air introducing passage inside said cooling air introducing portion communicates with the inside of said rotor yoke through a corresponding air vent,
   the other end of the cooling air introducing passage inside said cooling air introducing portion opens forward in the rotational direction of said magnet rotor through an opening end provided in the cooling air introducing portion,
   said cooling air introducing portion has an outer side wall provided to extend in a sloping direction from near a corresponding air vent toward an outer peripheral portion of said rotor yoke and reach said opening end, and
   the opening end of said cooling air introducing portion is directed in a sloping direction toward an inner diameter of said rotor yoke with respect to the direction orthogonal to a reference plane including both a straight line between the center of the bottom wall of said rotor yoke and the center of a corresponding air vent, and a central axis of said rotor yoke.

2. The magneto generator according to claim 1, wherein the sectional shape of said cooling air introducing portion is determined so that the sectional shape of said cooling air introducing passage is substantially rectangular inside a portion between a portion along said reference plane of said cooling air introducing portion and the opening end of said cooling air introducing portion.

3. The magneto generator according to claim 1, wherein a vane portion extending forward in the rotational direction of said magnet rotor from the opening end of said cooling air introducing portion along the outer peripheral portion of said rotor yoke is provided to be continuous with the outer side wall of said cooling air introducing portion.

4. The magneto generator according to claim 1, wherein a vane portion extending forward in the rotational direction of said magnet rotor from the opening end of said cooling air introducing portion along the outer peripheral portion of said rotor yoke is provided to be continuous with the outer side wall of said cooling air introducing portion, and a boundary between an end surface of the opening end of said cooling air introducing portion and said vane portion is formed so that the end surface of the opening end is continuous with an inner side surface of the vane portion via a smoothly curved surface.

5. The magneto generator according to claim 1, wherein a straightening vane is provided in a secured manner to the bottom wall of said rotor yoke, said straightening vane being placed more forward than the opening end of said cooling air introducing portion in the rotational direction of said magnet rotor and straightening air flowing into the cooling air introducing passage inside said cooling air introducing portion.

6. The magneto generator according to claim 1, wherein the bottom wall of said rotor yoke further includes a plurality of auxiliary air vents that provide communication between the inside and the outside of said rotor yoke.

7. The magneto generator according to claim 1, wherein said cooling air introducing portion is formed integrally with the bottom wall of said rotor yoke.

8. A magneto generator comprising:

a magnet rotor having a cup-shaped rotor yoke with a peripheral wall and a bottom wall and a permanent magnet mounted to an inner periphery of the peripheral wall of the rotor yoke; and an armature placed inside the magnet rotor, wherein the bottom wall of said rotor yoke is drilled at a portion closer to an outer periphery to provide a plurality of circumferential air vents in said peripheral wall, an annular plate having a plurality of through holes corresponding to the plurality of air vents in the bottom wall of said rotor yoke, and a plurality of cooling air introducing portions each provided to protrude in an opposite direction to said rotor yoke and cover at least a part of each of said plurality of through holes from outside is placed with said through holes communicating with corresponding air vents and fastened by screws to the bottom wall of said rotor yoke, a cooling air introducing passage is formed inside each of said cooling air introducing portions, and an end of the cooling air introducing passage communicates with a corresponding through hole, the other end of the cooling air introducing passage inside said cooling air introducing portion opens forward in the rotational direction of said magnet rotor through an opening end of said cooling air introducing portion, said cooling air introducing portion has an outer side wall provided to extend in a sloping direction from near a corresponding through hole toward the outer peripheral portion of said rotor yoke and reach said opening end, and the opening end of said cooling air introducing portion is directed in a sloping direction toward an inner diameter of said rotor yoke with respect to the direction orthogonal to a reference plane including both a straight line between the center of the bottom wall of said rotor yoke and the center of a corresponding through hole, and a central axis of said rotor yoke.

9. The magneto generator according to claim 8, wherein the sectional shape of said cooling air introducing portion is determined so that the sectional shape of said cooling air introducing passage is substantially rectangular inside a portion between a portion along said reference plane of said cooling air introducing portion and the opening end of said cooling air introducing portion.

10. The magneto generator according to claim 8, wherein a vane portion extending forward in the rotational direction of said magnet rotor from the opening end of said cooling air introducing portion along the outer peripheral portion of said rotor yoke is provided to be continuous with the outer side wall of said cooling air introducing portion.

11. The magneto generator according to claim 8, wherein a vane portion extending forward in the rotational direction of said magnet rotor from the opening end of said cooling air introducing portion along the outer peripheral portion of said rotor yoke is provided to be continuous with the outer side wall of said cooling air introducing portion, and is formed so that an end surface of the opening end of said cooling air introducing portion is continuous with an inner side surface of said vane portion via a smoothly curved surface.

12. The magneto generator according to claim 8, wherein a straightening vane is secured said annular plate, said straightening vane being placed more forward than the opening end of said cooling air introducing portion in the rotational direction of said magnet rotor and straightening air flowing into the cooling air introducing passage inside said cooling air introducing portion.

13. The magneto generator according to claim 8, wherein the bottom wall of said rotor yoke further includes a plurality of auxiliary air vents that provide communication between the inside and the outside of said rotor yoke, and said annular plate further includes auxiliary through holes that communicate with said plurality of air vents.

* * * * *